US012257660B2

(12) United States Patent
Seo

(10) Patent No.: US 12,257,660 B2
(45) Date of Patent: Mar. 25, 2025

(54) MACHINE TOOL CABLE PROTECTION DEVICE

(71) Applicant: DN SOLUTIONS CO., LTD., Changwon (KR)

(72) Inventor: Eunsoo Seo, Changwon (KR)

(73) Assignee: DN SOLUTIONS CO., LTD., Changwon (KR)

( * ) Notice: Subject to any disclaimer, the term of this patent is extended or adjusted under 35 U.S.C. 154(b) by 0 days.

(21) Appl. No.: 18/549,170

(22) PCT Filed: Mar. 3, 2022

(86) PCT No.: PCT/KR2022/003019
§ 371 (c)(1),
(2) Date: Sep. 6, 2023

(87) PCT Pub. No.: WO2022/191502
PCT Pub. Date: Sep. 15, 2022

(65) Prior Publication Data
US 2024/0157495 A1 May 16, 2024

(30) Foreign Application Priority Data
Mar. 9, 2021 (KR) .......................... 10-2021-0030494

(51) Int. Cl.
*B23Q 11/08* (2006.01)
*B23Q 5/58* (2006.01)
*H02G 11/02* (2006.01)

(52) U.S. Cl.
CPC ................ *B23Q 11/08* (2013.01); *B23Q 5/58* (2013.01); *H02G 11/02* (2013.01); *B23Q 2220/006* (2013.01)

(58) Field of Classification Search
CPC ................................................ B23Q 2220/006
See application file for complete search history.

(56) References Cited

U.S. PATENT DOCUMENTS 6,431,018 B1 * 8/2002 Okada .................. B25J 19/0025
74/490.02
2020/0078889 A1 * 3/2020 Repossini ............ B23Q 1/5406

FOREIGN PATENT DOCUMENTS

JP 05318377 A * 5/1992

* cited by examiner

*Primary Examiner* — Vicky A Johnson
(74) *Attorney, Agent, or Firm* — Harvest IP Law, LLP

(57) ABSTRACT

The present disclosure relates to a machine tool cable protection device including a universal head having a rotary part and rotatably and tiltably installed in a ram body, a cable having one side connected to a rotary part of the universal head, and the other side connected to a supply source, a rotation unit disposed on the rotary part of the universal head and configured to wind or unwind the cable while rotating in conjunction with a rotation direction and a rotation angle of the rotary part of the universal head, and a movement unit disposed in the ram body so as to rectilinearly reciprocate to compensate for a change in length of the cable that is wound around or unwound from the rotation unit in accordance with a rotation direction and a rotation angle of the rotation unit.

13 Claims, 8 Drawing Sheets

*500:510,520,530,540,550

*400:410,420,430,440

*400:410,420,430,440

MACHINE TOOL CABLE PROTECTION DEVICE

CROSS REFERENCE TO RELATED APPLICATION(S)

This application is a National Stage of International Application No. PCT/KR2022/003019filed on Mar. 3, 2022, claiming priority based on Korean Patent Application No. 10-2021-0030494 filed on Mar. 9, 2021 the disclosure of which is incorporated herein by reference in their entirety.

FIELD OF THE DISCLOSURE

The present disclosure relates to a machine tool cable protection device, and more particularly, to a machine tool cable protection device that improves the durability of cables by preventing the cables, which are connected to a universal head, from being burnt out by mutual friction caused when the universal head rotates.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used to suit the purpose of the corresponding work in various industrial sites.

The multi-tasking machining center, among the machine tools, refers to a turning center equipped with a multifunctional automatic tool changer (ATC) and a tool magazine in order to perform various types of machining processes such as turning, drilling, tapping, or milling. In the case of the multi-tasking machining center, an operator manually mounts a tool on a tool magazine when loading the tool required for a machining process or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which transfers the workpiece to machine the workpiece, a palette used to prepare the workpiece to be machined, a spindle coupled to a tool or the workpiece and configured to be rotated, and a tailstock and a steady rest configured to support the workpiece during the machining process.

In general, the machine tool is provided with a transfer unit configured to transfer the table, a tool post, the spindle, the tailstock, and the steady rest along a transfer shaft in order to perform various types of machining processes.

Further, the machine tool generally uses a plurality of tools in order to perform various types of machining processes, and a tool magazine or a turret is used in the form of a tool storage place for receiving and storing the plurality of tools.

The machine tool uses the plurality of tools in order to perform various types of machining processes, and the tool magazine is used in the form of a tool storage place for receiving and storing the plurality of tools.

In addition, the machine tool is equipped with the automatic tool changer (ATC) configured to withdraw a specific tool from the tool magazine or remount the tool on the tool magazine based on an instruction of a numerical control unit in order to improve productivity of the machine tool.

Further, the machine tool is generally equipped with an automatic palette changer (APC) in order to minimize the non-machining time. The automatic palette changer (APC) automatically changes the palettes between a workpiece machining region and a workpiece loading region. The workpiece may be mounted on the palette.

In the case of a universal head is applied to the machine tool, operation parts, such as a supply source and the universal head, are connected by means of cables of a hydraulic hose, an electric wire, a pneumatic pressure path, and the like in order to smoothly perform precise machining processes.

In general, in the case of the machine tool to which the universal head is applied, the universal head is mounted at a front end of a ram body of the machine tool, and a tool is mounted on the mounted universal head, such that the universal head performs various types of machining processes while rotating and/or tilting.

However, in the case of the machine tool in the related art to which the universal head is applied, the cables of the hydraulic hose, the electric wire, the pneumatic pressure path, and the like, which are connected to an upper portion of the universal head, are disposed in the ram body, and the cables also rotate in the ram body together with the universal head when the universal head rotates.

As described above, an internal space in the ram body, in which the cables configured by a plurality of lines, such as the hydraulic hose, the electric wire, and the pneumatic pressure path, are stored is spatially limited by a size of the ram body.

In case that the cables configured by the plurality of lines, such as the hydraulic hose, the electric wire, and the pneumatic pressure path are rotated in the limited space in conjunction with the rotation of the universal head, the cables are repeatedly twisted or untwisted, and the cables are eventually warped and tangled.

In case that the machine tool is used consistently in the state in which the cables are warped and tangled as described above, friction between the cables increases, which eventually causes a problem in that the surfaces of the cables are burnt out, and the cables are disconnected.

DISCLOSURE

Summary

The present disclosure has been made in an effort to solve the above-mentioned problem, and an object of the present disclosure is to provide a machine tool cable protection device, in which a movement unit is disposed in a ram body so as to be able to rectilinearly reciprocate in order to compensate for a change in length of a cable that remains after the cable is wound around or unwound from a rotation unit in accordance with a rotation direction and a rotation angle of the rotation unit, such that warping or twisting of the cable connected to a universal head is basically prevented when the universal head rotates, thereby improving the durability of the cable.

In order to achieve the object of the present disclosure, the present disclosure provides a machine tool cable protection device including: a universal head having a rotary part and rotatably installed in a ram body; a cable having one side connected to a rotary part of the universal head, and the other side connected to a supply source; a rotation unit disposed on the rotary part of the universal head and configured to wind or unwind the cable while rotating in conjunction with a rotation direction and a rotation angle of the rotary part of the universal head; and a movement unit disposed in the ram body so as to rectilinearly reciprocate to compensate for a change in length of the cable remaining after being wound around or unwound from the rotation unit in accordance with a rotation direction and a rotation angle of the rotation unit.

In addition, according to another exemplary embodiment of the machine tool cable protection device according to the present disclosure, when a rotation angle by which the rotary part of the universal head rotates clockwise or counterclockwise from a reference position is increased, the length of the cable remaining after the cable is wound around the rotation unit may be decreased, and the movement unit may rectilinearly move in a direction toward the rotation unit to compensate for the change in length of the remaining cable and prevent damage to the cable.

In addition, according to another exemplary embodiment of the machine tool cable protection device according to the present disclosure, when a return rotation angle of the rotary part of the universal head is increased when the rotary part of the universal head returns to the reference position after the rotary part of the universal head is rotated, the length of the cable remaining after the cable is unwound from the rotation unit may be increased, and the movement unit may rectilinearly move in a direction away from the rotation unit to compensate for the change in length of the remaining cable and prevent damage to the cable.

In addition, according to another exemplary embodiment of the machine tool cable protection device according to the present disclosure, the rotation unit may include: a main body part detachably installed on the rotary part of the universal head and extending in a length direction so that the cable is wound around or unwound from an outer peripheral edge of the main body part; a through part formed through the main body part; and a flange part protruding from the outer peripheral edge of the main body part and configured to guide a process in which one side of the cable having passed through the through part is wound around or unwound from the outer peripheral edge of the main body part in conjunction with a rotation of the rotary part of the universal head.

In addition, according to another exemplary embodiment of the machine tool cable protection device according to the present disclosure, the rotation unit may further include a supporting part disposed adjacent to the through part to prevent a part of one side of the cable having passed through the through part from curling into the inside of the main body part.

In addition, according to another exemplary embodiment of the machine tool cable protection device according to the present disclosure, the movement unit may include: a fixing part installed in the ram body; an elastic part installed at one side of the fixing part and configured to be elastically deformed to correspond to the change in length of the cable remaining after being wound around or unwound from the main body part; a roller part installed to be rollably coupled to the other side of the elastic part; and a cableveyor part configured such that the cable is inserted and coupled into the cableveyor part, the cableveyor part being disposed to slide along the roller part in conjunction with the change in length of the cable remaining after being wound around or unwound from the main body part.

In addition, according to another exemplary embodiment of the machine tool cable protection device according to the present disclosure, the movement unit may include a support part disposed on an outer portion of the ram body and configured to support a sliding motion of the cableveyor part.

In addition, according to another exemplary embodiment of the machine tool cable protection device according to the present disclosure, the support part may include: a rail part positioned between the fixing part and the rotation unit, provided on the outer portion of the ram body, and extending in a length direction; and a block part installed to rectilinearly reciprocate along the rail part.

In addition, according to another exemplary embodiment of the machine tool cable protection device according to the present disclosure, one end of the cableveyor part, from which the other side of the cable is withdrawn, may be fixed to the ram body, the other end of the cableveyor part, from which one side of the cable is withdrawn, may be coupled to the block part, and elastic deformation of the elastic part may be induced as the block part rectilinearly moves in conjunction with the change in length of the cable remaining after being wound around or unwound from the main body part.

In addition, according to another exemplary embodiment of the machine tool cable protection device according to the present disclosure, a transfer length of the block part may be equal to a length of an outer peripheral edge of the main body part.

In addition, according to another exemplary embodiment of the machine tool cable protection device according to the present disclosure, the machine tool cable protection device may include a guide unit installed in the ram body so as to be disposed between the rotation unit and the movement unit and having a passage part partially opened so that the cable remaining after being wound around or unwound from the rotation unit passes through the passage part.

In addition, according to another exemplary embodiment of the machine tool cable protection device according to the present disclosure, the machine tool cable protection device may include an auxiliary unit installed in the ram body so as to be disposed between the guide unit and the movement unit and having a guide part partially opened to guide the cable having passed through the passage part to the movement unit.

In addition, according to another exemplary embodiment of the machine tool cable protection device according to the present disclosure, the passage part and the guide part may each be formed to be rounded downward in a length direction.

In addition, according to another exemplary embodiment of the machine tool cable protection device according to the present disclosure, when the cable is provided as one or more cables, the through part may be provided as one or more through parts spaced apart from one another in a length direction to correspond to the number of cables and disposed in a staggered manner at a predetermined angle with respect to a central axis of the universal head rotary part, and the flange parts may be formed in multiple stages at upper sides of the through parts and protrude from the outer peripheral edge of the main body part so as to correspond to the through parts formed in a staggered manner while being spaced apart from one another in the length direction of the main body part.

According to the machine tool cable protection device according to the present disclosure, the movement unit is disposed in the ram body so as to be able to rectilinearly reciprocate to compensate for the change in length of the cable remaining after being wound around or unwound from the rotation unit in accordance with the rotation direction and the rotation angle of the rotation unit. Further, the change in length of the cable is transferred to the outside of the ram body when the universal head rotates, thereby eliminating a spatial limitation in the ram body. Further, the cable transferred by the rotation unit is converted into the rectilinear movement by the conveyance unit, thereby basically preventing warping or twisting of the cable connected to the universal head and improving the durability of the cable.

In addition, according to the machine tool cable protection device according to the present disclosure, the cable is primarily wound around or unwound from the rotation unit when the universal head rotates, and the conveyance unit secondarily rectilinearly moves in accordance with the length of the cable remaining after being wound around or unwound from the rotation unit, such that the machine tool may perform various and complicated machining processes without damaging the cable, thereby improving the stability and reliability of the machine tool.

Further, the machine tool cable protection device according to the present disclosure may reduce the occurrence of the replacement time and replacement costs for the cables with the plurality of complicatedly tangled lines caused by damage to the cables including the hydraulic hose, the electric wire, the pneumatic pressure path, and the like. Therefore, it is possible to reduce maintenance costs for the machine tool and minimize the non-machining time, thereby improving the productivity of the machine tool.

DETAILED DESCRIPTION OF CERTAIN INVENTIVE EMBODIMENT

Figure 1:
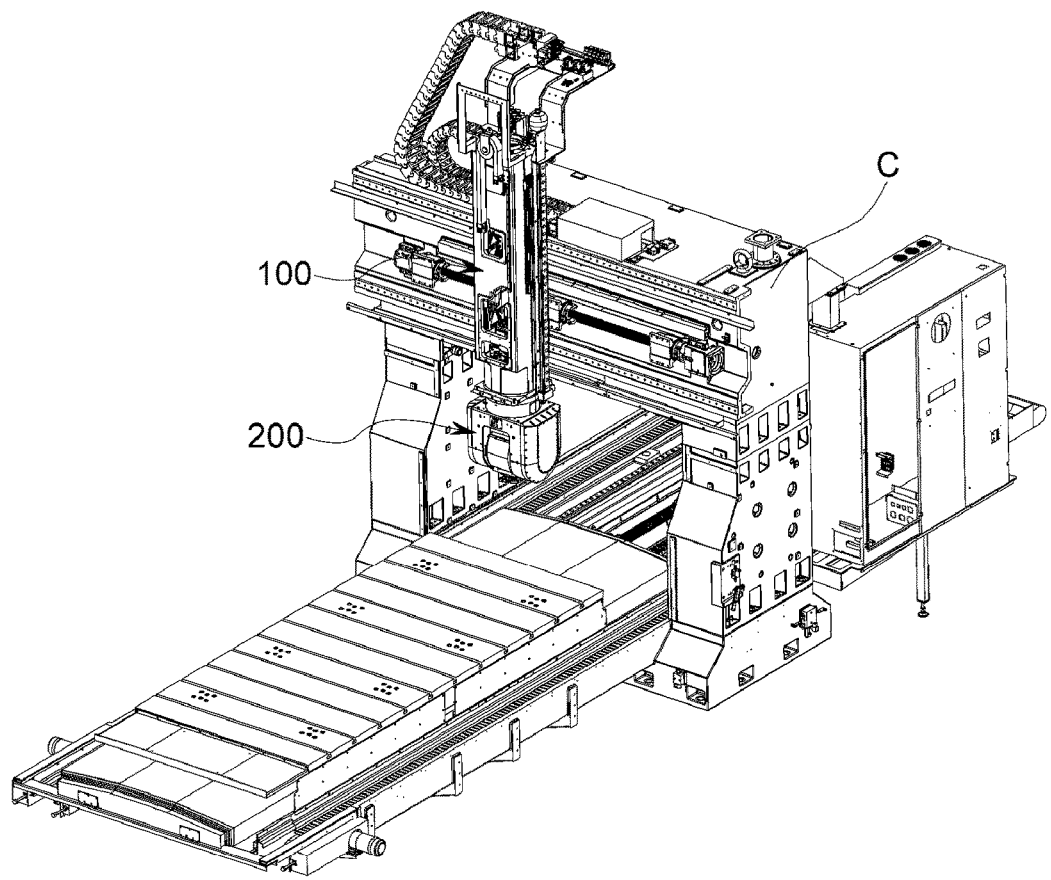
FIG. 1 is a perspective view illustrating a machine tool to which a machine tool cable protection device according to an embodiment of the present disclosure is applied.

Hereinafter, an apparatus for operating a main shaft of a machine tool according to an exemplary embodiment of the present disclosure will be described in detail with respect to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 2:
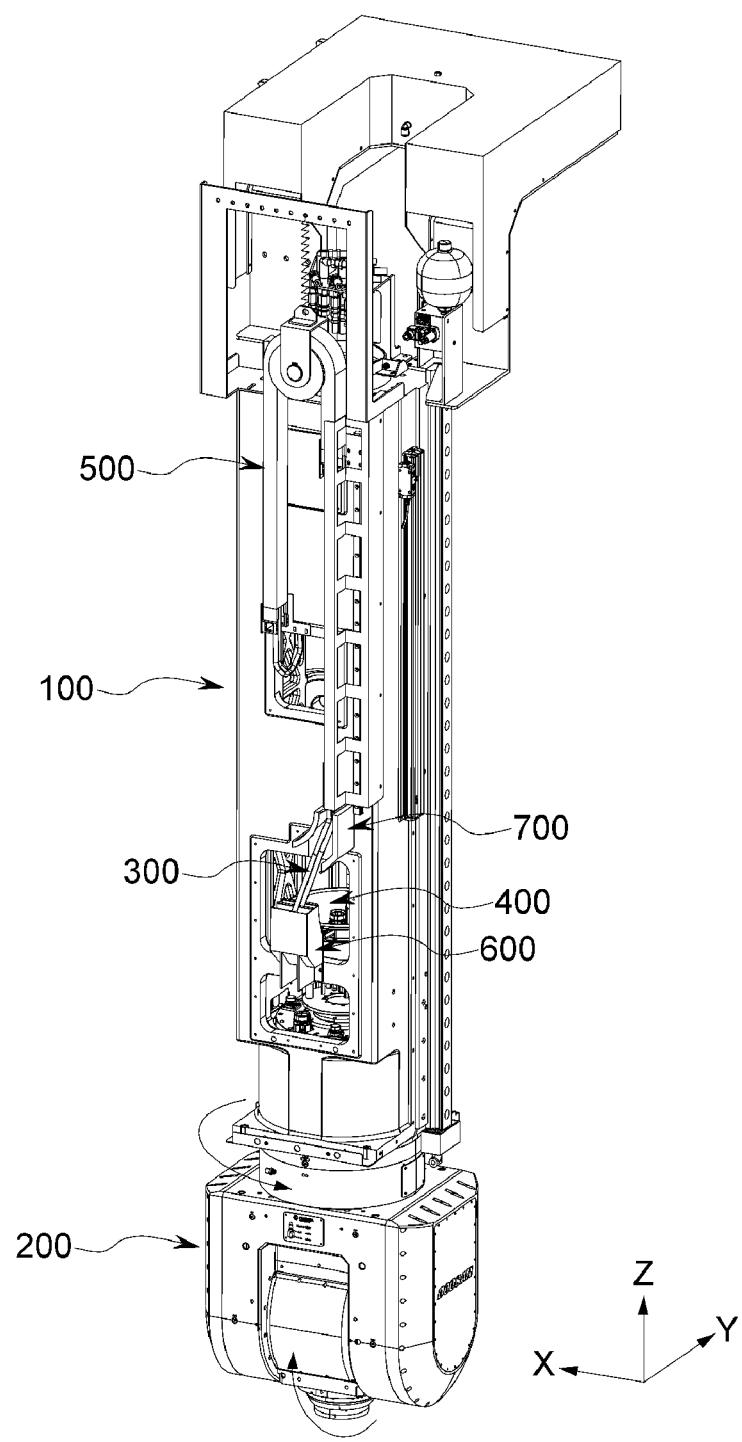
FIG. 2 is a perspective view illustrating a universal head and a ram body to which the machine tool cable protection device according to the embodiment of the present disclosure is applied.

FIG. 1 is a perspective view illustrating a machine tool to which a machine tool cable protection device according to an embodiment of the present disclosure is applied, and FIG. 2 is a perspective view illustrating a universal head and a ram body to which the machine tool cable protection device according to the embodiment of the present disclosure is applied.

Figure 3:
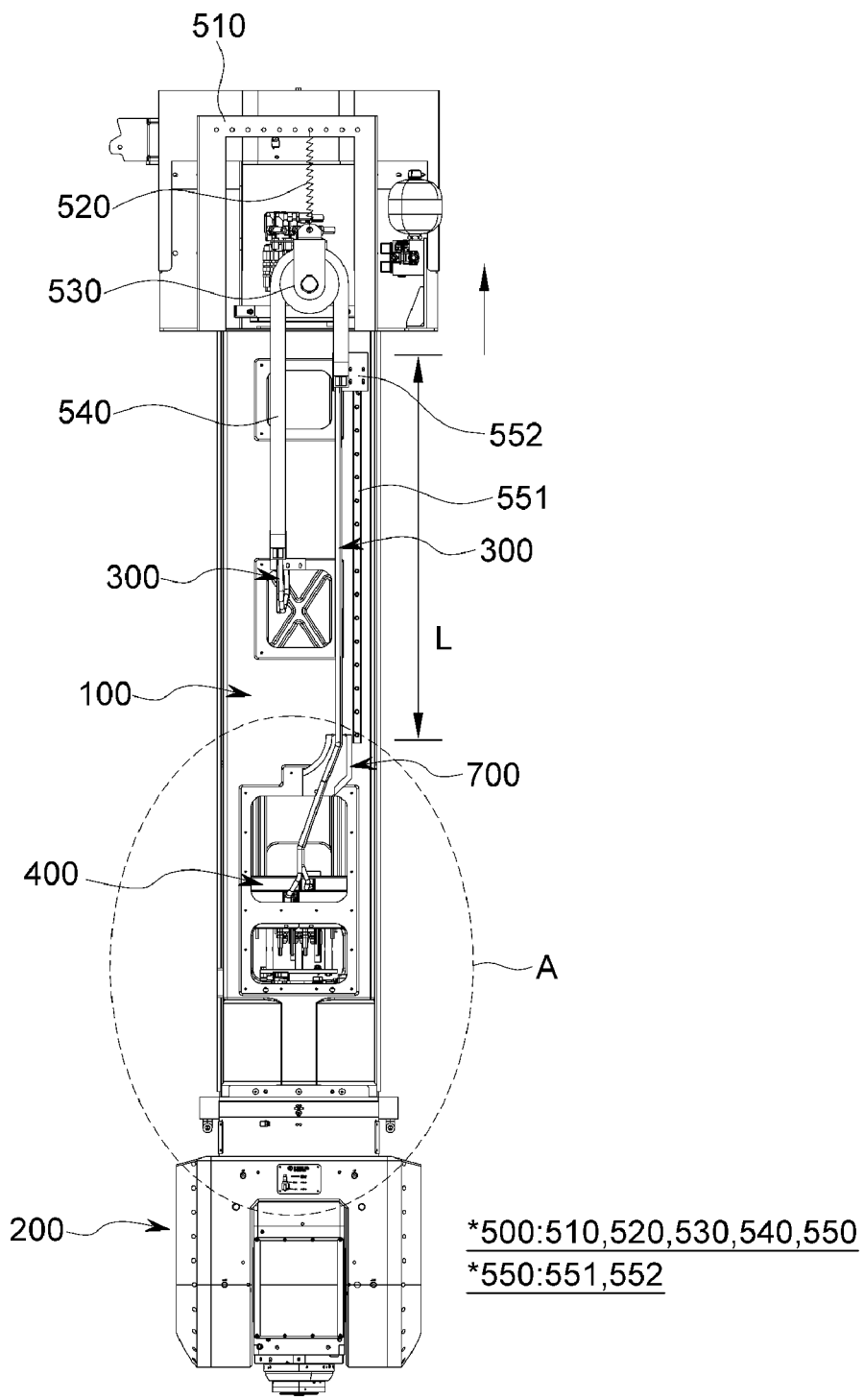
FIG. 3 is a view illustrating a state in which a rotation angle by which a rotary part of the universal head rotates from a reference position clockwise or counterclockwise is increased.
Figure 4:
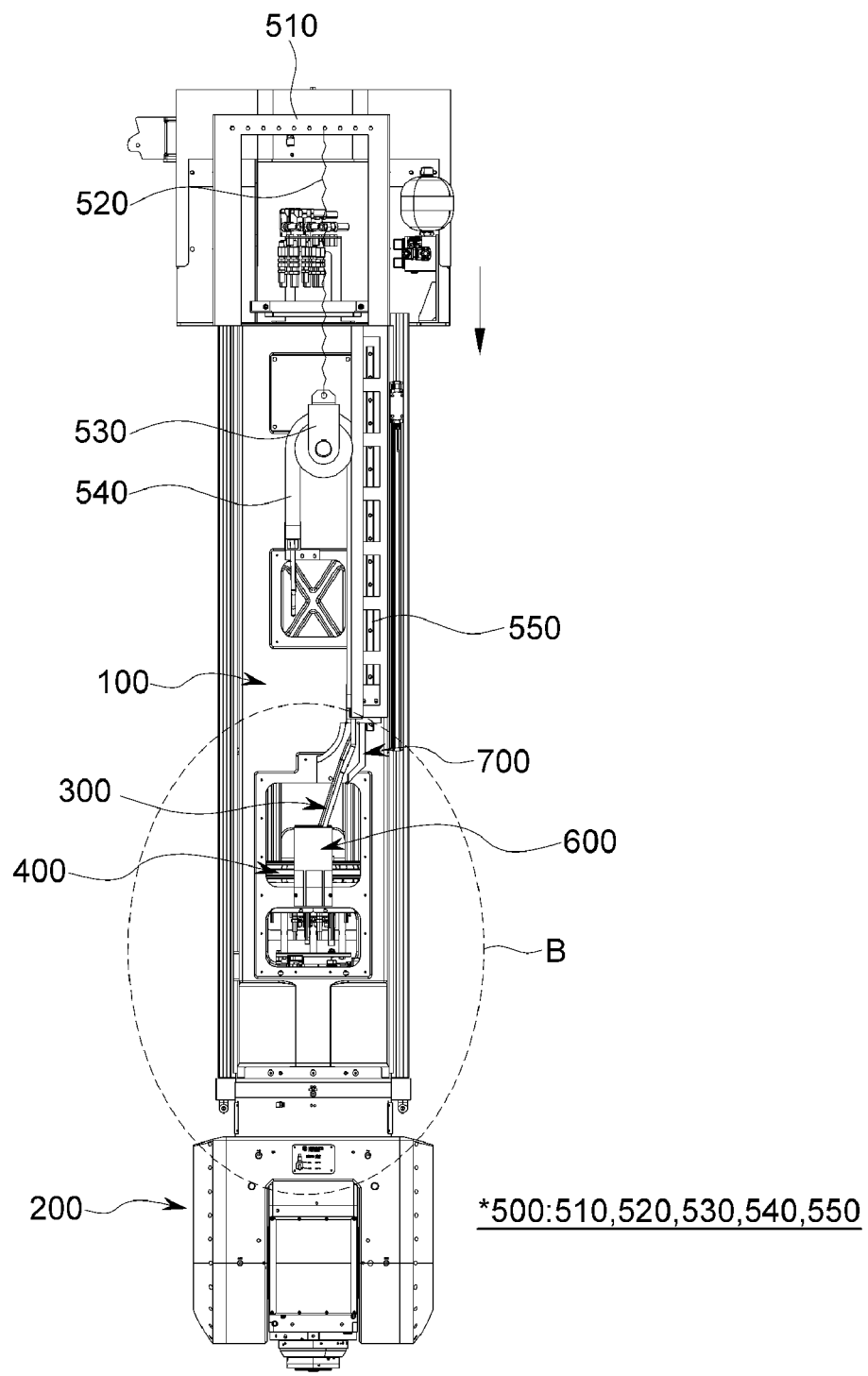
FIG. 4 is a view illustrating a state in which a return rotation angle of the rotary part of the universal head is increased when the rotary part of the universal head returns to the reference position after the rotary part of the universal head rotates.

FIG. 3 is a view illustrating a state in which a rotation angle by which a rotary part of the universal head rotates from a reference position clockwise or counterclockwise is increased, and FIG. 4 is a view illustrating a state in which a return rotation angle of the rotary part of the universal head is increased when the rotary part of the universal head returns to the reference position after the rotary part of the universal head rotates.

Figure 5:
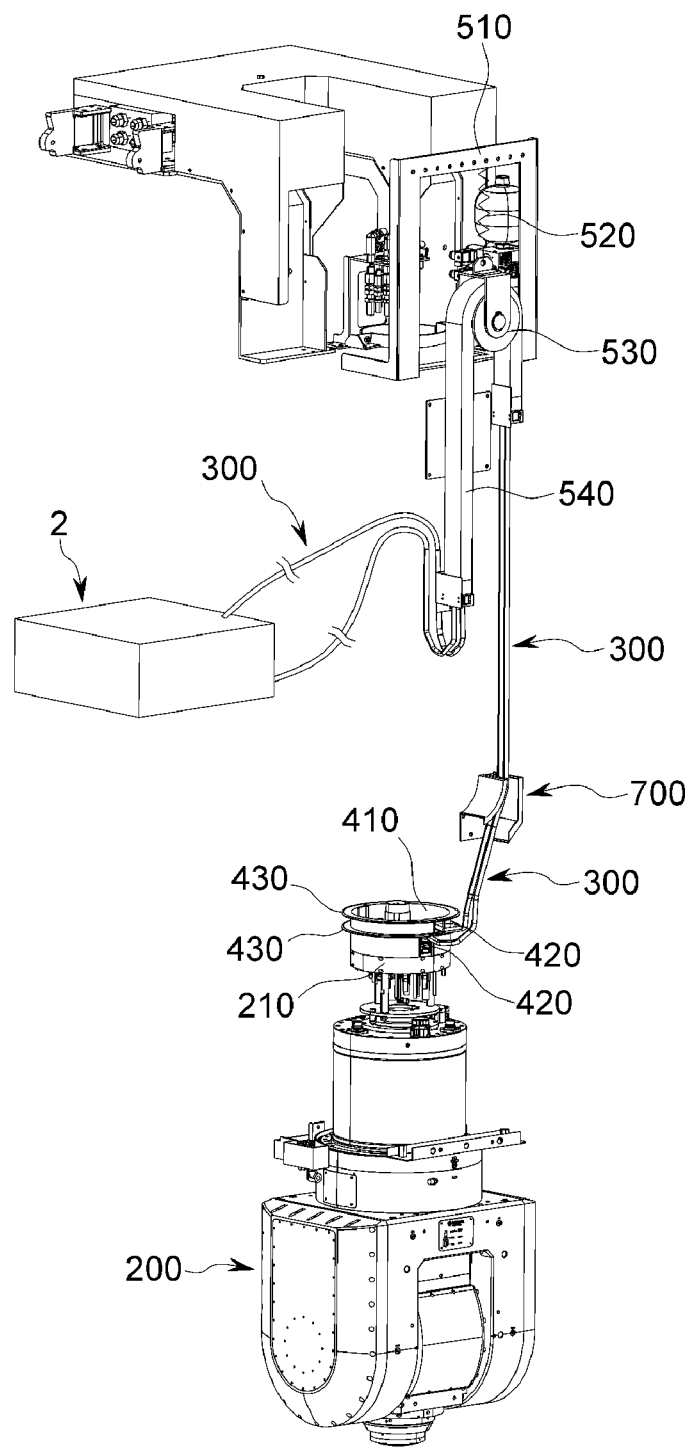
FIG. 5 is a view illustrating a state in which the ram body is removed.
Figure 6:
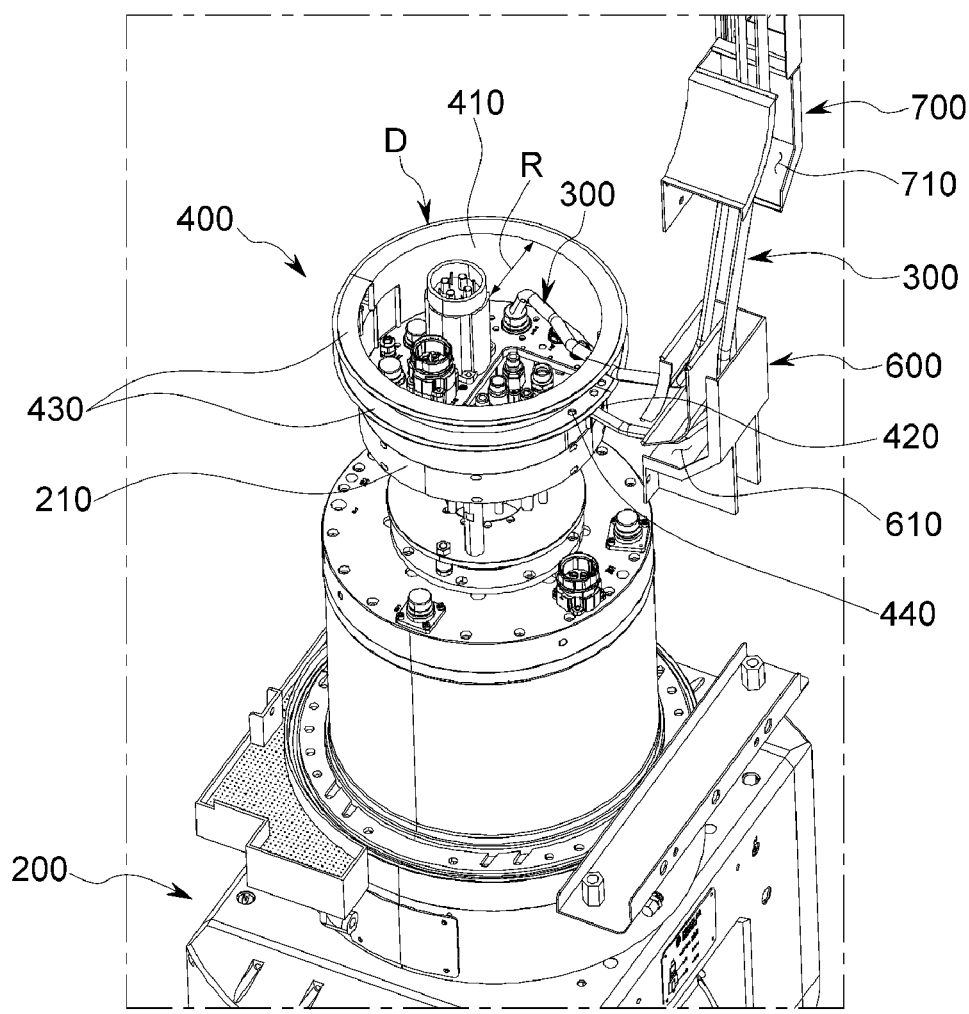
FIG. 6 is a detailed view illustrating part A in a state in which the rotation unit in FIG. 3 is positioned at the reference position.

FIG. 5 is a view illustrating a state in which the ram body is removed, and FIG. 6 is a detailed view illustrating part A in a state in which the rotation unit in FIG. 3 is positioned at the reference position.

Figure 7:
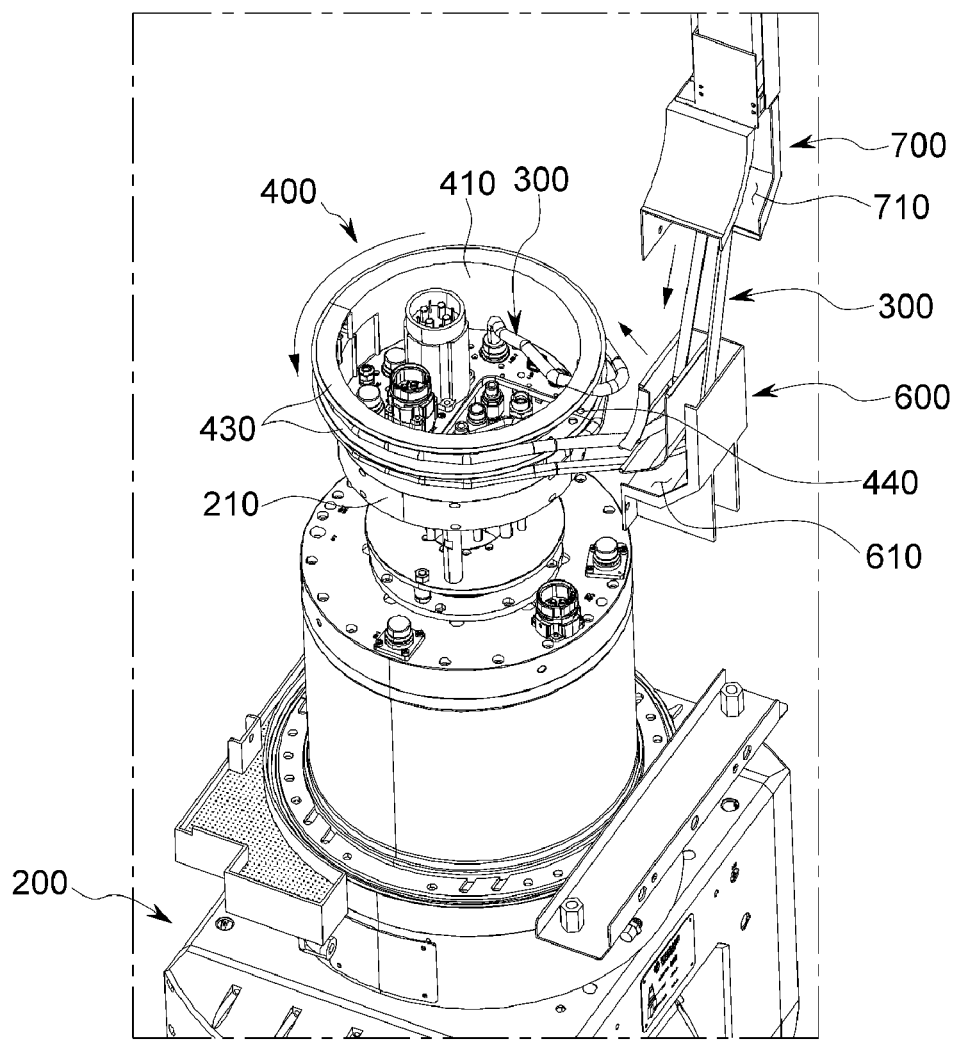
FIG. 7 is a detailed view illustrating part B in a state in which the rotation unit in FIG. 4 is rotated counterclockwise.
Figure 8:
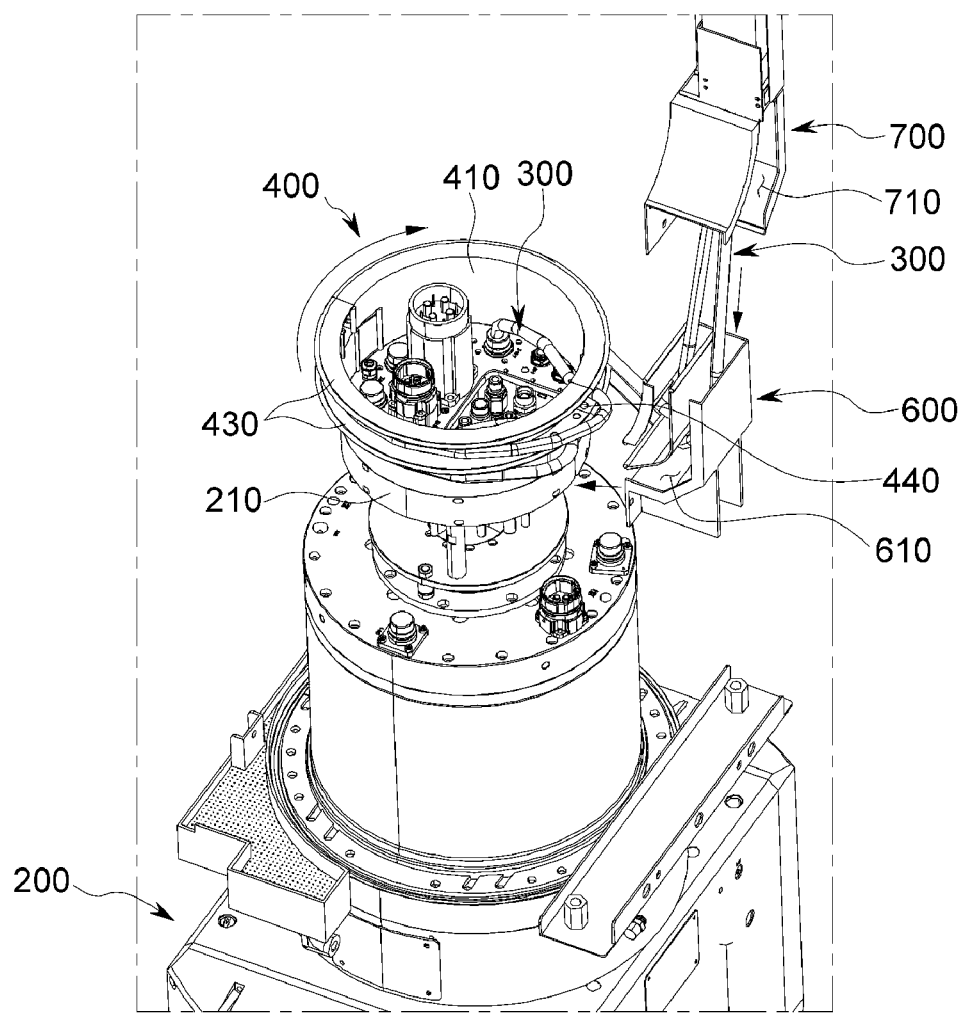
FIG. 8 is a detailed view illustrating part B in a state in which the rotation unit in FIG. 4 is rotated clockwise.

FIG. 7 is a detailed view illustrating part B in a state in which the rotation unit in FIG. 4 is rotated counterclockwise, and FIG. 8 is a detailed view illustrating part B in a state in which the rotation unit in FIG. 4 is rotated clockwise.

The terms used below are defined as follows. The term "horizontal direction" means a horizontal direction, i.e., an X-axis direction in FIG. 2 on the same member, the term "length direction" means a height direction, i.e., a Z-axis direction in FIG. 2 on the same member that is orthogonal to the horizontal direction, and the term "vertical direction" means a vertical direction, i.e., a Y-axis direction in FIG. 2 on the same member that is orthogonal to the horizontal direction and the length direction. In addition, the term "upward (upper)" means an upward direction in the length direction, i.e., a direction toward an upper side in the Z-axis direction in FIG. 2, and the term "downward (lower)" means a downward direction in the length direction, i.e., a direction toward a lower side in the Z-axis direction in FIG. 2.

A machine tool cable protection device 1 according to an embodiment of the present disclosure will be described with reference to FIGS. 1 to 8. As illustrated in FIGS. 1 to 8, the machine tool cable protection device 1 according to the embodiment of the present disclosure includes a ram body 100, a universal head 200, a cable 300, a rotation unit 400, a movement unit 500, a guide unit 600, and an auxiliary unit 700.

In the present disclosure, a machine tool may be one of all types of machine tools for machining workpieces. For example, the machine tools may include a turning center, a vertical/horizontal machining center, a door-type machining center, a Swiss turning machine, an electric discharge machine, a horizontal NC boring machine, a CNC lathe, and the like.

In particular, in the present disclosure, a vertical machine tool in which the ram body 100 and the universal head 200 are disposed vertically will be described in detail as an example. However, this configuration is provided only for the purpose of helping understand the present disclosure, and the machine tool is not necessarily limited to the vertical machine tool. The present disclosure may also be applied to other types of machine tools, such as horizontal machine tools.

The ram body 100 of the machine tool cable protection device 1 according to the embodiment of the present disclosure is movably installed on a column C. Specifically, the column C may be movably installed on a base or bed, and a position of the column C may be variously adjusted. However, the present disclosure is not necessarily limited thereto.

In addition, the universal head 200 is rotatably installed in the ram body 100, or the universal head 200 is rotatably and tiltably installed in the ram body 100. The rotation unit 400, the movement unit 500, the guide unit 600, and the auxiliary unit 700 are disposed inside and outside the ram body 100 to protect the cable 300.

The universal head 200 of the machine tool cable protection device 1 according to the embodiment of the present disclosure may be rotatably installed in the ram body 100 or rotatably and tiltably installed in the ram body 100, and tools may be clamped to the universal head 200, thereby performing various machining processes.

In addition, with reference to FIG. 5, a rotary part 210 is provided on the universal head 200. The rotary part 210 of the universal head 200 rotates together with the universal head 200 in conjunction with the rotation of the universal head 200.

The cable 300 of the machine tool cable protection device 1 according to the embodiment of the present disclosure may be configured by a plurality of lines such as a hydraulic hose, an electric wire, and a pneumatic pressure path. One side of the cable 300 is connected to the rotary part 210 of the universal head, and the other side of the cable 300 is connected to a supply source 2 and supplies hydraulic pressure, electricity, or the like required for the machining process. The supply source 2 may be provided as a plurality of supply sources 2, as necessary. The supply source 2 may be variously configured as a switchboard, a hydraulic pump, and the like.

The rotation unit 400 of the machine tool cable protection device 1 according to the embodiment of the present disclosure is disposed on the rotary part 210 of the universal head, and the cable 300 having one side connected to the rotary part 210 of the universal head is wound around or unwound from the rotation unit 400.

That is, the rotation unit 400 winds or unwinds the cable 300 while rotating in conjunction with the rotation direction and the rotation angle of the rotary part 210 of the universal head.

The rotation direction of the rotary part 210 of the universal head means a direction in which the rotary part 210 rotates clockwise and/or counterclockwise. The rotation angle of the rotary part 210 of the universal head means an angle representing a distance that the rotary part 210 rotates clockwise and/or counterclockwise.

Specifically, the cable 300 is not wound around or unwound from the rotation unit 400 in case that the rotary part 210 of the universal head is positioned at the reference position, i.e., the rotary part 210 is in an origin state in which the rotary part 210 is not rotated.

That is, the cable 300, in a natural state, passes through the guide unit 600 and/or the auxiliary unit 700 disposed outside the ram body 300 and is inserted and disposed into a cableveyor part 540.

In this case, because the cable 300 is pulled by an elastic part 520 of the movement unit 500 in a direction toward the elastic part 520, predetermined tension is applied to the cable 300, which may prevent the cable 300 from being twisted or tangled.

In addition, the cable 300 is wound around the rotation unit 400 in case that the rotation angle by which the rotary part 210 of the universal head rotates from the reference position clockwise or counterclockwise is increased.

On the contrary, the cable 300 is unwound from the rotation unit 400 when the return rotation angle of the rotary part 210 of the universal head is increased when the rotary part 210 of the universal head returns to the reference position after the rotary part 210 of the universal head is rotated.

The return rotation angle refers to an angle representing a distance that the rotation unit 400 rotates when the rotation unit 400 returns back to the reference position after the rotation unit 400 is rotated.

As described above, even in this case, the cable 300 is pulled in the direction toward the elastic part 520 by the elastic part 520 of the movement unit 500, and predetermined tension is applied to the cable 300. Therefore, the cable 300 may be wound while being brought into close contact with the rotation unit 400 by the tension in case that the cable 300 is wound. Even when the cable is unwound, the tension may be applied, which may prevent the cable 300 from being twisted or tangled.

With reference to FIGS. 5 to 8, the rotation unit 400 includes a main body part 410, a through part 420, a flange part 430, and a supporting part 440.

The main body part 410 extends in a length direction (the Z-axis direction in FIG. 2) so that the cable 300 may be wound around or unwound from an outer peripheral edge of the main body part 410. The main body part 410 is detachably installed on the rotary part 210 of the universal head.

The main body part 410 may be integrally formed. Alternatively, the main body part 410 may include two or more components, and the components may be coupled, as necessary, such that the main body part 410 may be easily fastened and disassembled when the main body part 410 is attached to or detached from the rotary part 210 of the universal head. However, the present disclosure is not necessarily limited thereto.

The through part 420 is formed through the main body part 410. The through part 420 is a part through which the cable 300 having one side connected to the rotary part 210 of the universal head passes. The cable 300 having passed through the through part 420 is wound around or unwound from the outer peripheral edge of the main body part 410.

The flange part 430 protrudes from an outer peripheral edge of the main body part 410 in order to guide a process in which one side of the cable 300 having passed through the through part 420 is wound around or unwound from the outer peripheral edge of the main body part 410 in conjunction with the rotation of the rotary part 210 of the universal head.

That is, the flange part 430 may protrude from the outer peripheral edge of the main body part 410 and prevent the cable 300 from being mutually tangled or withdrawn to the outside of the outer peripheral edge of the main body part 410 during the process in which the cable 300 is wound around or unwound from the outer peripheral edge of the main body part 410 when the cable 300 is wound around or unwound from the outer peripheral edge of the main body part 410.

The supporting part 440 is disposed adjacent to the through part 420 to prevent a part of one side of the cable 300 having passed through the through part 420 from curling into the inside of the main body part 410.

For example, the supporting part 440 includes a hole and a strap penetratively formed in the flange part and disposed adjacent to the through part 420. The cable may be fixed by wrapping the cable with the strap and then fixing the strap into the hole.

In case that the supporting part 440 is provided as described above, it is possible to prevent the cable 300 from curling into the inside of the main body part and mutually tangled during the process in which the cable 300 is wound around or unwound from the outer peripheral edge of the main body part 410.

The cable 300 of the machine tool cable protection device 1 according to the embodiment of the present disclosure may be provided as one or more cables, as necessary.

With reference to FIG. 5, in case that one or more cables 300 are provided, one or more through parts 420 may be provided to be spaced apart from one another in the length direction so as to correspond to the number of cables 300 and disposed in a staggered manner at a predetermined angle with respect to a central axis of the rotary part 210 of the universal head.

That is, with reference to FIG. 5, two through parts are provided when two cables are provided. In this case, the through parts are spaced apart from each other in the length direction (spaced apart from each other vertically based on the drawings) to basically prevent the cables, which respectively pass through the through parts, from being mutually tangled. The positions of the through parts are also disposed in a staggered manner at a predetermined angle with respect to the central axis of the rotary part of the universal head.

In addition, in case that the one or more cables 300 are provided, the flange parts 430 are formed in multiple stages while protruding from the outer peripheral edge of the main body part 410 at upper sides of the through parts 420 so as to correspond to the through parts 420 disposed in a staggered manner while being spaced apart from one another in the length direction of the main body part 410.

That is, with reference to FIG. 5, two through parts are also provided when the two cables are provided. The flange parts are also formed in multiple stages while protruding from the outer peripheral edge of the main body part at the upper sides of the through parts 420 so as to correspond to the through parts formed in a staggered manner while being spaced apart from one another in the length direction of the main body part 410, thereby basically preventing the cables, which pass through the through parts and are wound around or unwound from the main body part, from being mutually tangled.

The movement unit 500 of the machine tool cable protection device 1 according to the embodiment of the present disclosure is disposed in the ram body 100 so as to be able to rectilinearly reciprocate and compensate for a change in length of the cable 300 remaining after the cable 300 is wound around or unwound from the rotation unit 400 in accordance with the rotation direction and the rotation angle of the rotation unit 400.

With reference to FIGS. 2 to 5, the movement unit 500 includes a fixing part 510, the elastic part 520, a roller part 530, the cableveyor part 540, and a support part 550.

The fixing part 510 is installed in the ram body 100. Specifically, the fixing part 510 may be fixedly installed on an outer portion of the ram body 100.

Particularly, as illustrated in the drawings, the fixing part is installed at an upper side when the rotation unit is installed at a lower side. The fixing part is installed at the other side when the rotation unit is installed at one side. The fixing part and the rotation unit may be disposed to be spaced apart from each other at a predetermined interval. However, the present disclosure is not necessarily limited thereto.

The elastic part 520 may have one side installed on the fixing part 510 so that the elastic part 520 may be elastically deformed to correspond to a change in length of the cable 300 remaining after the cable 300 is wound around or unwound from the main body part 410 of the rotation unit 400.

In addition, the elastic part 520 serves to impart an elastic force so that predetermined tension is kept applied to the cable 300.

With reference to FIGS. 3 and 4, in case that the length of the cable 300 is decreased as the cable 300 is wound around the main body part 410 of the rotation unit 400, the elastic part 520 is elastically deformed in the direction toward the rotation unit. In case that the cable 300 is unwound from the main body part 410 of the rotation unit 400, the elastic part 520 is elastically deformed in the direction away from the rotation unit.

For example, when the cableveyor part pulls the roller part in the direction toward the rotation unit when the rotation unit is rotated clockwise or counterclockwise by 360 degrees with respect to the main body part, the elastic part 520 may be elastically deformed while being maximally stretched in the direction toward the rotation unit.

On the contrary, when the main body part is positioned at the reference position, the elastic part 520 may be elastically deformed to the smallest extent.

The roller part 530 is installed to be rollably coupled to the other side of the elastic part 520. The roller part 530 may serve to transmit the tension of the elastic part 520 to the cableveyor part 540 and to guide the cableveyor part 540 so that the cableveyor part 540 may slide in conjunction with the change in length of the cable 300.

A width of the roller part may be equal to or larger than a width of the cableveyor part. The roller part may be made of a material, such as urethane, excellent in wear resistance. The roller part itself may roll to minimize the occurrence of frictional heat caused by a slip with the cableveyor part. However, the present disclosure is not necessarily limited thereto.

The support part 550 is disposed on the outer portion of the ram body 100 and serves to support the sliding motion of the cableveyor part 540.

With reference to FIG. 3, the support part 550 may include a rail part 551 positioned between the fixing part 510 and the rotation unit 400, disposed on the outer portion of the ram body 100, and extending in the length direction, and a block part 552 installed to be able to rectilinearly reciprocate along the rail part 551. The other end of the cableveyor part 540 is coupled to the block part 552, and the block part 552 rectilinearly reciprocates and supports the sliding motion of the cableveyor part 540 along the roller part 530.

The cable 300 is inserted and coupled into the cableveyor part 540, and the cableveyor part 540 is disposed to be slidable along the roller part 530 in conjunction with the change in length of the cable remaining after the cable is wound around or unwound from the main body part.

The cableveyor part 540 may have an accommodation groove in which the cable may be accommodated and fixed so that the cable 300 may be fixed inside the cableveyor part without moving inside the cableveyor part 540. Alternatively, the cable may be fixed and bound inside the cableveyor part by wrapping the cable with a strap in a hole formed through the cableveyor part.

With reference to FIGS. 3 and 4, one end of the cableveyor part 540, from which the other side of the cable 300 is withdrawn, may be fixed to the ram body 100, and the other end of the cableveyor part 540, from which one side of the cable 300 is withdrawn, may be coupled to the block part 552 of the support part 550.

That is, the cableveyor part 540 induces the elastic deformation of the elastic part 520 as the block part 552 rectilinearly moves in conjunction with the change in length of the cable remaining after being wound around or unwound from the main body part.

For example, the length of the cable is decreased when the cable is wound around the main body part of the rotation unit, and the block part moves in the direction toward the rotation unit (in the downward direction based on FIG. 4) in conjunction with the decrease in length of the cable.

In this case, because one end of the cableveyor part 540 is fixed to the ram body 100, the other end of the cableveyor part 540 coupled to the block part 552 of the support part 550 moves in the direction toward the rotation unit (in the downward direction based on FIG. 4).

Therefore, the cableveyor part 540 slides along the roller part and induces the elastic part to be elastically deformed and elongated in the direction toward the rotation unit (in the downward direction based on FIG. 4).

As described above, according to the machine tool cable protection device according to the present disclosure, the cable is primarily wound around or unwound from the rotation unit when the universal head rotates, and the conveyance unit secondarily rectilinearly moves in accordance with the length of the cable remaining after being wound around or unwound from the rotation unit, such that the machine tool may perform various and complicated machining processes without damaging the cable, thereby improving the stability and reliability of the machine tool.

With reference to FIGS. 3 and 6, a transfer length (L in FIG. 3) of the block part 552 of the support part 550 of the movement unit 500 may be equal to a length (D in FIG. 6) of an outer peripheral edge of the main body part 410 of the rotation unit 400.

Because $L=2\pi R=D$, a radius (R in FIG. 6) of the main body part may be specified in case that the transfer length (L in FIG. 3) of the block part 552 is determined to be suitable for a size of the ram body 100, for example. Further, the transfer length (L in FIG. 3) of the block part 552 may be specified to be suitable for the radius (R in FIG. 6) of the main body part when the radius (R in FIG. 6) of the main body part is determined.

In case that the transfer length (L in FIG. 3) of the block part 552 is smaller than the length (D in FIG. 6) of the outer peripheral edge of the main body part 410, the conveyance unit cannot compensate for the overall change in length of the cable remaining after being wound around or unwound from the outer peripheral edge of the main body part 410. For this reason, the tension, which is applied to the cable 300 when the cable 300 is pulled by the elastic part 520 in the direction toward the elastic part 520, is decreased, and the cable cannot be wound while being brought into close contact with the rotation unit 400 even when the cable 300 is wound. Even when the cable is unwound, the cable protection device cannot accurately operate because of the low tension, which makes it impossible to prevent the cable 300 from being twisted or tangled.

In case that the transfer length (L in FIG. 3) of the block part 552 is larger than the length (D in FIG. 6) of the outer peripheral edge of the main body part 410, an unnecessarily long rail part is disposed, which causes a resource waste. Further, a large ram body needs to be applied to dispose the long rail part, which hinders the miniaturization of the machine tool.

As described above, according to the machine tool cable protection device according to the present disclosure, the transfer length (L in FIG. 3) of the block part 552 of the support part 550 of the movement unit 500 is equal to the length (D in FIG. 6) of the outer peripheral edge of the main body part 410 of the rotation unit 400. Therefore, it is possible to not only maintain optimal tension of the cable to basically prevent the cables from being mutually twisted, tangled, and burnt out, but also make a size of the machine tool compact.

The guide unit 600 of the machine tool cable protection device 1 according to the embodiment of the present disclosure has a passage part 610 partially opened so that the cable 300 remaining after being wound around or unwound from the rotation unit 400 passes through the passage part 610. The guide unit 600 is installed in the ram body 100 so as to be disposed between the rotation unit 400 and the movement unit 500.

The auxiliary unit 700 of the machine tool cable protection device 1 according to the embodiment of the present disclosure has a guide part 710 partially opened to guide the cable 300 having passed through the passage part 610 to the movement unit 500. The auxiliary unit 700 is installed in the ram body 100 so as to be disposed between the guide unit 600 and the movement unit 500.

The guide unit 600 and the auxiliary unit 700 serve as passageways along which the cable connected to the rotation unit 400 moves to the movement unit.

That is, in case that the cable wound around the main body part of the rotation unit 400 is unwound, the cable moves in the direction from the rotation unit toward the movement unit through the passage part 610 of the guide unit 600 and the guide part 710 of the auxiliary unit 700.

On the contrary, when the cable is wound around the main body part of the rotation unit 400, the cable moves in the direction from the movement unit toward the rotation unit through the passage part 610 of the guide unit 600 and the guide part 710 of the auxiliary unit 700.

In addition, the passage part 610 of the guide unit 600 and the guide part 710 of the auxiliary unit 700 may each be formed to be rounded downward in the length direction. This is to prevent the cable from being burnt out by friction during the process in which the cable moves through the passage part 610 of the guide unit 600 and the guide part 710 of the auxiliary unit 700 as described above.

In the machine tool cable protection device 1 according to the embodiment of the present disclosure, when the rotation angle by which the rotary part 210 of the universal head rotates clockwise or counterclockwise from the reference position is increased, the length of the cable 300 remaining after being wound around the rotation unit 400 may be decreased, and the movement unit 500 may rectilinearly move in the direction toward the rotation unit 400 and compensate for the change in length of the cable 300, thereby preventing damage to the cable 300.

For example, with reference to FIGS. 4, 7, and 8, when the rotary part 210 of the universal head rotates clockwise or counterclockwise from the reference position, the cable is wound around the outer peripheral edge of the main body part, and the length of the cable remaining after being wound around the rotation unit 400 is decreased.

In this case, the cable moves in the direction from the movement unit toward the rotation unit through the passage part 610 of the guide unit 600 and the guide part 710 of the auxiliary unit 700, and the block part rectilinearly moves downward along the rail part in conjunction with the movement of the cable.

Meanwhile, because the block part is coupled to the other end of the cableveyor part, the cableveyor part also slides along the roller part while moving downward in conjunction with the movement of the block part.

Therefore, a force, which pulls the roller part downward, is generated and pulls downward the elastic part connected to the roller part, such that the elastic deformation of the elastic part is induced, and the length of the elastic part is increased, thereby compensating for the change in length of the shortened cable.

In the machine tool cable protection device 1 according to the embodiment of the present disclosure, when the rotary part 210 of the universal head returns to the reference position after the rotary part 210 of the universal head is rotated, the length of the cable 300 remaining after being unwound from the rotation unit 400 may be increased when the return rotation angle of the rotary part 210 of the universal head is increased, and the movement unit 500 may rectilinearly move in the direction away from the rotation unit 400 and compensate for the change in length of the cable 300, thereby preventing damage to the cable 300.

For example, with reference to FIGS. 3 and 6, when the rotary part 210 of the universal head returns to the reference position after the rotary part 210 of the universal head is rotated, the cable is unwound from the outer peripheral edge of the main body part, and the length of the cable 300 remaining after being unwound from the rotation unit 400 is increased.

In this case, the cable moves in the direction from the rotation unit toward the movement unit through the passage part 610 of the guide unit 600 and the guide part 710 of the auxiliary unit 700, and the block part rectilinearly moves upward along the rail part in conjunction with the movement of the cable.

Meanwhile, because the block part is coupled to the other end of the cableveyor part, the cableveyor part also slides along the roller part while moving upward in conjunction with the movement of the block part.

Therefore, the force, which pulls the roller part downward, is decreased, and a restoring force of the elastic part becomes dominant, such that the elastic deformation of the elastic part is induced so that the elastic part connected to the roller part is pulled upward, and the elastic part is shortened, thereby compensating for the change in length of the lengthened cable.

According to the machine tool cable protection device according to the present disclosure, the movement unit is disposed in the ram body so as to be able to rectilinearly reciprocate to compensate for the change in length of the cable remaining after being wound around or unwound from the rotation unit in accordance with the rotation direction and the rotation angle of the rotation unit. Further, the change in length of the cable is transferred to the outside of the ram body when the universal head rotates, thereby eliminating a spatial limitation in the ram body. Further, the cable transferred by the rotation unit is converted into the rectilinear movement by the conveyance unit, thereby basically preventing warping or twisting of the cable connected to the universal head and improving the durability of the cable.

In addition, the machine tool cable protection device according to the present disclosure may reduce the occurrence of the replacement time and replacement costs for the cables with the plurality of complicatedly tangled lines caused by damage to the cables including the hydraulic hose, the electric wire, the pneumatic pressure path, and the like. Therefore, it is possible to reduce maintenance costs for the machine tool and minimize the non-machining time, thereby improving the productivity of the machine tool.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

The invention claimed is:

1. A machine tool cable protection device comprising:
   a universal head having a rotary part and rotatably installed in a ram body;
   a cable having one side connected to a rotary part of the universal head, and the other side connected to a supply source;
   a rotation unit disposed on the rotary part of the universal head and configured to wind or unwind the cable while rotating in conjunction with a rotation direction and a rotation angle of the rotary part of the universal head; and
   a movement unit disposed in the ram body so as to rectilinearly reciprocate to compensate for a change in length of the cable remaining after being wound around or unwound from the rotation unit in accordance with a rotation direction and a rotation angle of the rotation unit,
   wherein the rotation unit comprises:
   a main body part detachably installed on the rotary part of the universal head and extending in a length direction so that the cable is wound around or unwound from an outer peripheral edge of the main body part;
   a through part formed through the main body part; and
   a flange part protruding from the outer peripheral edge of the main body part and configured to guide a process in which one side of the cable having passed through the through part is wound around or unwound from the outer peripheral edge of the main body part in conjunction with a rotation of the rotary part of the universal head.

2. The machine tool cable protection device of claim 1, wherein when a rotation angle by which the rotary part of the universal head rotates clockwise or counterclockwise from a reference position is increased, the length of the cable remaining after the cable is wound around the rotation unit is decreased, and the movement unit rectilinearly moves in a direction toward the rotation unit to compensate for the change in length of the remaining cable and prevent damage to the cable.

3. The machine tool cable protection device of claim 2, wherein when a return rotation angle of the rotary part of the universal head is increased when the rotary part of the universal head returns to the reference position after the rotary part of the universal head is rotated, the length of the cable remaining after the cable is unwound from the rotation unit is increased, and the movement unit rectilinearly moves in a direction away from the rotation unit to compensate for the change in length of the remaining cable and prevent damage to the cable.

4. The machine tool cable protection device of claim 1, wherein the rotation unit further comprises a supporting part disposed adjacent to the through part to prevent a part of one side of the cable having passed through the through part from curling into the inside of the main body part.

5. The machine tool cable protection device of claim 2, wherein the movement unit comprises:
   a fixing part installed in the ram body;
   an elastic part installed at one side of the fixing part and configured to be elastically deformed to correspond to the change in length of the cable remaining after being wound around or unwound from the main body part;
   a roller part installed to be rollably coupled to the other side of the elastic part; and
   a cableveyor part configured such that the cable is inserted and coupled into the cableveyor part, the cableveyor part being disposed to slide along the roller part in conjunction with the change in length of the cable remaining after being wound around or unwound from the main body part.

6. The machine tool cable protection device of claim 5, wherein the movement unit comprises a support part disposed on an outer portion of the ram body and configured to support a sliding motion of the cableveyor part.

7. The machine tool cable protection device of claim 6, wherein the support part comprises:

a rail part positioned between the fixing part and the rotation unit, provided on the outer portion of the ram body, and extending in a length direction; and
a block part installed to rectilinearly reciprocate along the rail part.

8. The machine tool cable protection device of claim 7, wherein one end of the cableveyor part, from which the other side of the cable is withdrawn, is fixed to the ram body, the other end of the cableveyor part, from which one side of the cable is withdrawn, is coupled to the block part, and elastic deformation of the elastic part is induced as the block part rectilinearly moves in conjunction with the change in length of the cable remaining after being wound around or unwound from the main body part.

9. The machine tool cable protection device of claim 7, wherein a transfer length of the block part is equal to a length of an outer peripheral edge of the main body part.

10. The machine tool cable protection device of claim 1, comprising:
    a guide unit installed in the ram body so as to be disposed between the rotation unit and the movement unit and having a passage part partially opened so that the cable remaining after being wound around or unwound from the rotation unit passes through the passage part.

11. The machine tool cable protection device of claim 10, comprising:
    an auxiliary unit installed in the ram body so as to be disposed between the guide unit and the movement unit and having a guide part partially opened to guide the cable having passed through the passage part to the movement unit.

12. The machine tool cable protection device of claim 11, wherein the passage part and the guide part are each formed to be rounded downward in a length direction.

13. The machine tool cable protection device of claim 1, wherein when the cable is provided as one or more cables, the through part is provided as one or more through parts spaced apart from one another in a length direction to correspond to the number of cables and disposed in a staggered manner at a predetermined angle with respect to a central axis of the universal head rotary part, and
    wherein the flange parts are formed in multiple stages at upper sides of the through parts and protrude from the outer peripheral edge of the main body part so as to correspond to the through parts formed in a staggered manner while being spaced apart from one another in the length direction of the main body part.

* * * * *